Feb. 25, 1958 W. WAGNER 2,824,756
CONDUIT FITTING WITH REMOVABLE INSERT
Filed April 7, 1954
FIG. 1. FIG. 2. FIG. 3.
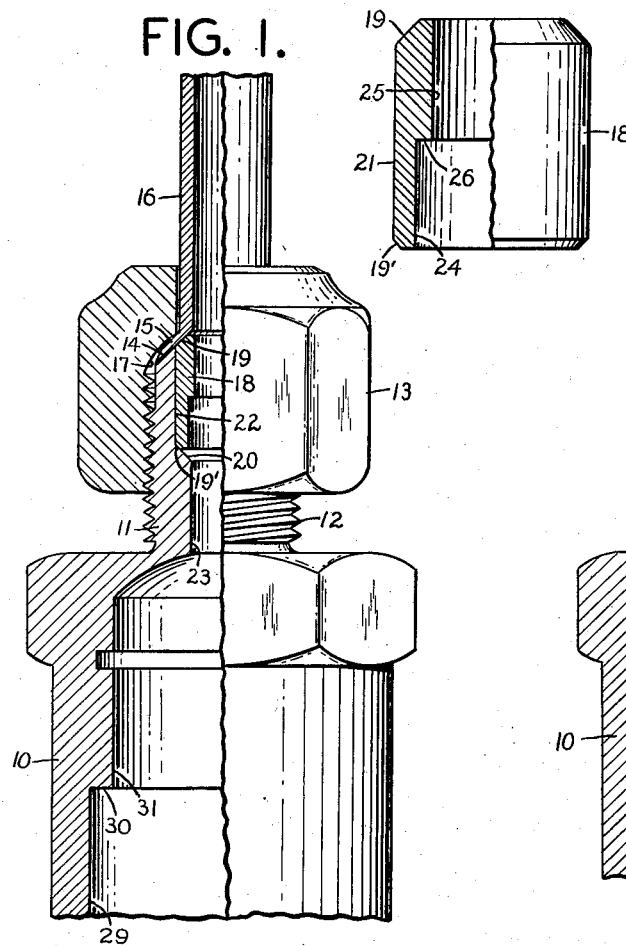
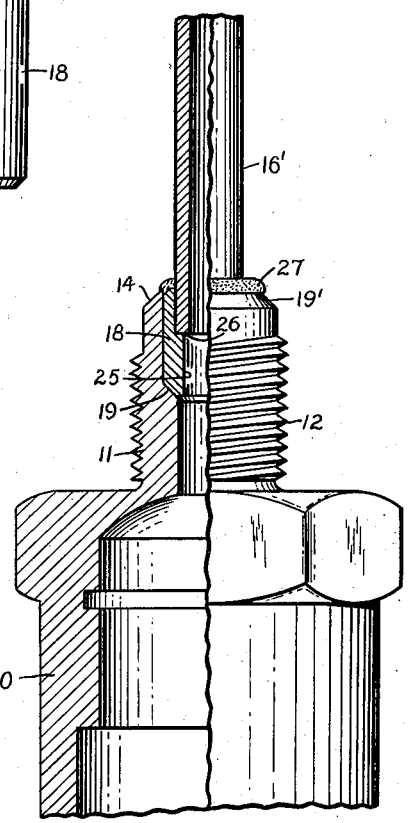
FIG. 6. FIG. 4. FIG. 5.
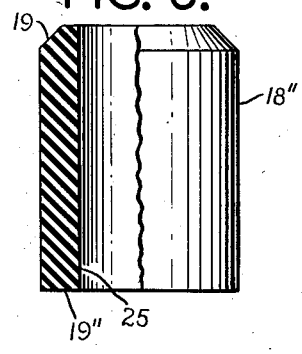
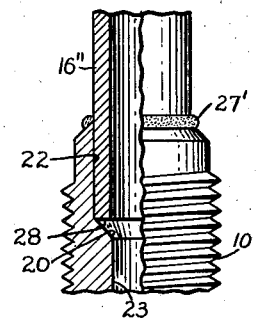
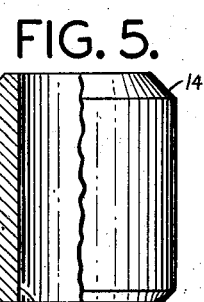
INVENTOR
WILLIAM WAGNER
BY
ATTORNEY United States Patent Office 2,824,756
Patented Feb. 25, 1958

2,824,756
CONDUIT FITTING WITH REMOVABLE INSERT
William Wagner, Rockaway, N. J.
Application April 7, 1954, Serial No. 421,549
2 Claims. (Cl. 285—12)

This invention relates to the art of conduit fittings and particularly concerns a novel interchangeable fitting adapted to receive a flared or a straight end connecting conduit as desired.

The present invention provides a fitting or union adapted for holding flared tubing in a permanent or a quick detachable connection, and further adapted for holding alternatively straight end tubing in a soldered or "sweated" connection.

Distributors and users of conduit fittings have heretofore been required to supply and use two different types of fittings. Each type is intended to receive a tube of certain size but is adapted for holding either a flared end tube or a straight end tube. No single fitting heretofore has been adapted to hold a tube of a certain size regardless of whether the end of the tube was flared or straight. As a result the distributor's inventory of stock sizes of fittings has had to be duplicated for both types of connections. Manufacturers have been burdened by the necessity of supplying two types of fittings for each size, each type being intended for a different kind of connection. This has resulted in higher production costs and higher costs to dealers and customers.

I propose by the present invention to lower tool costs, reduce handling, packaging, inventory and invested capital of manufacturers, distributors and consumers alike, insofar as fittings are concerned, by providing a single type of fitting to replace the two types of fittings above mentioned.

It is thus a principal object of the invention to provide a fitting adapted to receive alternatively as desired flared or straight end tubing of a single size.

It is a further object to provide a fitting adapted to receive alternatively as desired flared end tubing of a certain size, straight end tubing of the same size, or straight end tubing of a smaller size.

It is a further object to provide a fitting adapted to hold tubing of a certain size and having a flared end, in a screw type connection, and alternatively to receive the tubing with a straight end in a soldered connection.

It is a further object to provide a fitting adapted to receive a cylindrical insert whereby the fitting may hold a connecting conduit with a flared end or non-flared straight end.

Other and further objects and advantages of the invention will become readily apparent from the following description taken together with the drawing wherein:

Fig. 1 is an elevational view partly in section of a fitting embodying the invention and holding a tube with a flared end.

Fig. 2 shows an insert employed in the fitting of Fig. 1.

Fig. 3 shows the fitting of Fig. 1 holding a tube having a straight end and a smaller diameter than that of the flared tube of Fig. 1.

Fig. 4 shows the fitting of Fig. 1 holding a tube having a straight end and a diameter equal to that of the flared tube of Fig. 1.

Fig. 5 shows an alternative form of insert.
Fig. 6 shows a further alternative form of insert.

In Fig. 1 is shown a fitting having a generally cylindrical housing or body 10 with a nipple 11 at one end. Nipple 11 has a thread 12 for receiving the hexagonal nut 13. The free end 14 of nipple 11 is conically tapered to receive the flared end 15 of a straight tube or conduit 16. The nut 13 has a generally conical inner seat 17 which serves to secure the flared end of tube 16 to the nipple 11 when the nut is tightened on thread 12. Only part of the bearing surface for the conical flared end 15 of tube 16 is furnished by the end of nipple 11. The remainder of the bearing surface is furnished by the conically tapered end 19 of the cylindrical insert 18. Insert 18 has its other end 19' conically tapered to fit snugly in the conical seat or shoulder 20 inside the nipple 11. The outer wall 21 of the insert fits snugly inside the nipple 11 in contact with the inner wall or bore 22 of the nipple. The diameters of walls 21 and 22 are substantially equal.

In Fig. 2 the insert 18 is shown on an enlarged scale. The insert is freely removable from the cavity in nipple 11 defined in part by bore 22 and seat 20. The bore 22 necessarily has a larger diameter than that of bore 23 in nipple 11 and is joined thereto by the conical section 20. The diameter of bore 22 is substantially equal to that of the unflared portion of tube 16. The insert 18 is provided with a bore 24 which has a diameter greater than that of bore 25 in the remainder of the insert with a square shoulder 26 at the line of junction of the bores.

In Fig. 3 is shown that utility of bore 24. When insert 18 is reversed in position from that shown in Fig. 1, a tube 16" having a straight end lodges in bore 24 on shoulder 26. Solder 27 applied by conventional means serves to secure the tube 16' in the bore 24 and to secure the insert 18 in the nipple 11. With insert 18 in the position shown in Fig. 3, the solder overlaps the end 14 of the nipple and the end 19' of the insert while surrounding tube 16'. The other end 19 of the insert seats snugly on shoulder 20 in the nipple. Tube 16' has an outer diameter less than that of tube 16 so that insert 18 serves as an adapter for the fitting to adapt it to receive either the flared tube 16 as shown in Fig. 1 or the straight tube 16'.

In Fig. 4 is shown further the manner in which the fitting is adapted to receive a cylindrical tube 16" having an outer diameter substantially equal to the straight portion of tube 16 in Fig. 1. The end 28 of tube 16" seats on shoulder 20 in the same manner as ends 19 and 19' of insert 18. The outer wall of tube 16" fits snugly with a friction fit against the surrounding wall or bore 22 of the nipple. Solder 27' holds the tube in the bore 22. In this use of the fitting the insert 18 and nut 13 is not required. In Fig. 3, the fitting requires use of insert 18 while in Fig. 1, the fitting requires both the insert 18 and nut 13.

It will be noted that the fitting 10 is thus adapted to receive and hold a straight or flared end tube as desired. And the straight tube may have the same or a smaller diameter than that of the flared tube.

In Fig. 5 is shown the modified form of insert 18' in which bore 25 is continuous throughout, that is the enlarged bore 24 and seat 26 are omitted. This insert is adapted for use in the arrangement shown in Fig. 1, but in the arrangement shown in Fig. 4, the insert 18' would not be used. In the arrangement of Fig. 3 only the insert 18 could be used.

The inserts 18 and 18' are preferably formed of a suitable metal such as brass, bronze, stainless steel and the like. In such use the connections whether made as shown in Figs. 1 or 3 would be fixed and permanent, that of Fig. 1 being more conveniently detachable by use of a wrench. In certain uses it may be desired to provide a quick detachable connection. The insert 18" shown in Fig. 6 is adapted for this type of connection. Insert 18" is formed of a resilient material such as fiber, neoprene, nylon or other plastic or elastomeric material. The upper end 19 of the insert 18" is tapered to receive the bearing surface of the flared end 15 of tube 16. The other end 19" of the insert has a squared seat which is forced into seat 20 of the fitting when the nut 13 is tightened on the nipple 11. Since the insert is flexible the connection is quickly detachable when nut 13 is unscrewed from the nipple.

The manner of assembly of the fitting with a tube 16, 16' or 16" will be readily apparent from the drawing, the user having the option of using the fitting with any one of the three tubes. The simplest assembly is that shown in Fig. 4 where tube 16" is inserted in bore 22 and then secured in place by solder 27'.

In Fig. 3, the insert 18 is placed in the nipple with bore 25 uppermost. Tube 16' is inserted in the bore and then solder 27 is applied to hold tube and insert in the fitting.

In Fig. 1, the insert 18 is inserted in bore 22, with nut 13 removed. Tube 16 is then placed on the fitting with the flared end 15 in abutment with the end walls 14 and 19 of nipple 11 and the insert 18 respectively. Nut 13 is then placed over the tube 16 and tightened on nipple 11 to secure the tube, insert and fitting in a fluid-tight connection.

No limitation is intended to be placed on the particular application of the fitting herein disclosed. It may be made an integral part of any plumbing accessory. For example in Fig. 1 the fitting 10 is shown provided with a bore 29 and having a shoulder 30 at the line of junction with the inner bore 31. The bore 29 is adapted to receive a pipe or tube (not shown) which can be soldered to the fitting. In this manner the fitting 10 can be joined to or made an integral part of a valve, drier, strainer and the like.

A particular feature of the new fitting herein disclosed is that it can be manufactured by mass production processes at a cost substantially that of a conventional type fitting. Thus the advantage is obtained that dealers and users of fittings can reduce by half their stocks of fittings and inventory costs will likewise be cut in half. Manufacturers and dealers are now required to maintain duplicate stocks of items such as valves, strainers, etc. of which fittings are integral parts. They are also required to maintain duplicate stocks of individual fittings such as elbows, T's, crosses etc. The individual stocks are required for flared and straight tube connections respectively. Often these stocks amount to thousands of items. The handling and storage of these numerous items is a formidable task and the large inventory costs and the large amount of capital dedicated to maintaining the duplicate stocks makes almost imperative some means for reducing them. By the relatively simple means herein disclosed, a 50% reduction in stocking facilities and inventory costs is at once obtained. When inserts such as those shown in Figs. 1, 2, 3 are used, the inventory requirements of manufacturers, dealers and consumers may be still further reduced because a single size fitting can be used for two different sizes of straight tubing in addition to being adapted for making a flared end connection.

Although a limited number of modifications of the invention have been disclosed, the invention is not liimted thereto for many changes are possible without departing from the spirit of the invention as defined by the scope of the appended claims:

I claim:

1. A conduit fitting having a tubular connecting portion provided with a conical outer end, a counterbore formed in said tubular portion concentrically therewith and inwardly from its said conical outer end and defining a conical annular shoulder on the inside of said tubular portion a spaced distance below its said conical outer end, said tubular portion being relatively thin-walled in the area between said annular shoulder and said conical outer end, a tubular insert removably mounted within said counterbore, the inner end of said tubular insert being conical in shape and complementary to the said annular shoulder, said tubular portion and said tubular insert having a common axis and their respective conical ends having substantially the same angular relationship to said axis, said tubular insert being cylindrical throughout its outer dimension, the outer diameter of said tubular insert corresponding, substantially, to the diameter of said counterbore to provide a relatively snug fit of said tubular insert within said counterbore, the length of said tubular insert along its outer cylindrical dimension corresponding, substantially, to the length of the counterbore above said annular shoulder, the inner conical end of said tubular insert being seated against said annular shoulder, the outer end of said tubular insert being disposed adjacent the conical outer end of said tubular portion, and a counterbore formed in said tubular insert inwardly from its outer end and defining an annular shoulder on the inside of said tubular insert a spaced distance below its said outer end, said tubular insert being relatively thin-walled in the area between its said annular shoulder and its outer end, the inner diameter of said tubular insert below its said annular shoulder corresponding, substantially, to the inner diameter of said tubular portion below the annular shoulder within said tubular portion, said tubular insert being adapted to receive a conduit tube within its said counterbore, the annular shoulder within said tubular insert being adapted to seat the inner end of said conduit tube, whereby that part of the tubular portion below its annular shoulder and that part of the tubular insert below its annular shoulder are adapted to constitute a substantially continuous conduit with said conduit tube, whereby said thin-walled portions of the tubular portion and tubular insert are adapted to be soldered to each other and to the conduit tube, said tubular insert being reversible within said tubular portion to bring its conical end into juxtaposition with the conical outer end of the tubular portion, the angles of the respective conical ends of said tubular portion and said tubular insert being substantially alike, whereby a substantially continuous conical surface is provided at said conical ends of said tubular portion and said tubular insert and whereby said continuous conical surface is adapted to seat the flared end of a flared conduit tube.

2. A conduit fitting having a tubular connecting portion provided with a conical outer end, a counterbore formed in said tubular portion concentrically therewith and inwardly from its said conical outer end and defining a conical annular shoulder on the inside of said tubular portion a spaced distance below its said conical outer end, said tubular portion being relatively thin-walled in the area between said annular shoulder and said conical outer end, a tubular insert removably mounted within said counterbore, the inner end of said tubular insert being conical in shape and complementary to the said annular shoulder, said tubular portion and said tubular insert having a common axis and their respective conical ends having substantially the same angular relationship to said axis, said tubular insert being cylindrical throughout its outer dimension, the outer diameter of said tubular insert corresponding, substantially, to the diameter of said counterbore to provide a relatively snug fit of said tubular insert within said counterbore, the length of said tubular insert along its outer cylindrical dimension corresponding, substantially, to the length of the counterbore above said annular shoulder, the inner conical end of said tubular insert being seated against said annular shoulder, the outer end of said tubular insert being disposed adjacent the conical outer end of said tubular portion, and a counterbore formed in said tubular insert inwardly from its outer end and defining an annular shoulder on the inside of said tubular insert a spaced distance below its said outer end, said tubular insert being relatively thin-walled in the area between its said annular shoulder and its outer end, the inner diameter of said tubular insert below its said annular shoulder corresponding, substantially, to the inner diameter of said tubular portion below the annular shoulder within said tubular portion, said tubular insert being adapted to receive a conduit tube within its said counterbore, the annular shoulder within said tubular insert being adapted to seat the inner end of said conduit tube, whereby that part of the tubular portion below its annular shoulder and that part of the tubular insert below its annular shoulder are adapted to constitute a substantially continuous conduit with said conduit tube, whereby said thin-walled portions of the tubular portion and tubular insert are adapted to be soldered to each other and to the conduit tube, external screw threads being formed on said tubular portion below its conical outer end, and an inwardly flanged nut being mounted on said tubular portion in engagement with said external screw threads, said tubular insert being reversible within said tubular portion to bring its conical end into juxtaposition with the conical outer end of the tubular portion, the angles of the respective conical ends of said tubular portion and said tubular insert being substantially alike, whereby a substantially continuous conical surface is provided at said conical ends of said tubular portion and said tubular insert and whereby said continuous conical surface is adapted to seat the flared end of a flared conduit tube, whereby the flanged nut is adapted to clamp the flared end of said flared conduit tube to said continuous conical surface, and whereby said continuous conical surface is adapted to provide an adequate supporting seat for said flared end of the flared conduit tube under the pressure of said clamping action.

References Cited in the file of this patent

UNITED STATES PATENTS

| | | |
|---|---|---|
| 772,136 | Dossert | Oct. 11, 1904 |
| 943,900 | Smith | Dec. 21, 1909 |
| 1,881,943 | Rader | Oct. 11, 1932 |
| 1,987,100 | Dick | Jan. 8, 1935 |
| 2,001,204 | Long | May 14, 1935 |
| 2,065,524 | Groeniger | Dec. 29, 1936 |
| 2,159,811 | Leonardo | May 23, 1939 |
| 2,390,103 | Johnson | Dec. 4, 1945 |
| 2,420,778 | Herold | May 20, 1947 |
| 2,424,727 | Wenk | July 29, 1947 |
| 2,438,107 | Babbitt | Mar. 23, 1948 |
| 2,564,804 | Everett | Aug. 21, 1951 |
| 2,596,020 | Fletcher | May 6, 1952 |

FOREIGN PATENTS

| | | |
|---|---|---|
| 719,279 | France | Nov. 14, 1931 |
| 442,134 | Great Britain | Feb. 3, 1936 |
| 484,163 | Great Britain | Apr. 29, 1938 |